United States Patent Office 3,200,122
Patented Aug. 10, 1965

3,200,122
PROCESS FOR THE PREPARATION OF 2:9-DI-
METHYL-QUINACRIDINE-7:14-DIONE
Henri Streiff, Birsfelden, Switzerland, assignor to Ciba
Limited, Basel, Switzerland, a company of Switzerland
No Drawing. Filed Oct. 7, 1963, Ser. No. 314,491
Claims priority, application Switzerland, Oct. 9, 1962,
11,810/62; Aug. 30, 1963, 10,798/63
6 Claims. (Cl. 260—279)

It has been proposed to obtain quinacridone sulfonic acids by heating 2:5-diarylamino-terephthalic acids in concentrated sulfuric acid, and to convert the said quinacridone sulfonic acids into corresponding quinacridones free from sulfonic acid groups by heating under superatmospheric pressure in dilute inorganic acids (cf. U.S. patent application filed April 2, 1962, by Armin Caliezi et al., Serial No. 187,151). However, this process is difficult to carry out on an industrial scale with the conventional types of apparatus, and is not satisfactory for the preparation of 2:9-diethylquinacridone, as is evident from the appendix to Example 7.

The 2:9-dimethylquinacridone is also obtained although in a form unfit for pigmenting purposes, when prepared according to the process described in Example 7 of Belgian specification No. 606,415, granted July 20, 1961, to Werner Deuschel et al., in which ring closure is brought about by a sulfonating mixture comprising an aromatic hydrocarbon and oleum.

The present invention is based on the surprising observation that 2:9-dimethyl-quinacridine-7:14-dione can be obtained in a technically simple manner when sulfuric acid of at least 70% strength or oleum is allowed to act on 2:5-di-(para-toluidino)-terephthalic acid or the esters thereof, and, if products are formed that contain sulfonic acid groups, the sulfonic acid groups that have been introduced are split off with sulfuric acid of at most 92%, preferably at most 90%, strength without the application of superatmospheric pressure.

The 2:5-di-(para-toluidino)-terephthalic acids or the esters thereof to be used in the process of the invention can be prepared by known methods, for example, by condensing succinylosuccinic acid ester with para-toluidine and then oxidising and, if desired or required, hydrolysing. It is, however, advantageous to use free 2:5-di-(para-toluidino)-terephthalic acid.

It is advantageous to use at least one part by weight of sulfuric acid or oleum, but preferably 2 to 5 parts, for each part by weight of 2:5-di-(para-toluidino)-terephthalic acid. When working with oleum it is advantageous to use oleum having an $SO_3$ content not exceeding 20%.

The cyclisation is advantageously carried out at an elevated temperature, for example, at a temperature between 50 and 200° C.

A change in color of the solution indicates the end of the cyclisation process. The solution, which is initially yellow in color, turns green and finally deep violet. When using sulfuric acid having a concentration of about 90% and above, a portion of the resulting dimethyl quinacridone molecules is sulfonated in the cyclisation process.

It is not necessary to isolate the dimethylquinacridone sulfonic acids from the reaction mixture in order to split off the sulfo groups. A specially advantageous method of carrying out the process of the invention consists in adding water to the reaction mixture in order to obtain the reduced sulfuric acid concentration required for the hydrolysis. The sulfuric acid concentration is advantageously between 60 and 92%, and the temperature at which hydrolysis is carried out is advantageously between 100 and 180° C., depending on the concentration of the acid. The hydrolysis is effected in a short period of time in this temperature range.

By reason of its insolubility in dilute sulfuric acid, the dimethylquinacridone thus obtained can be isolated by filtration.

The crude product, which is obtained in excellent yield, can be subjected to the conventional purification operations, for example, reprecipitation from sulfuric acid. Pure dimethylquinacridone is obtained with only very slight loss. Instead of first separating the dimethylquinacridone that is formed from the dilute sulfuric acid and then reprecipitating it from concentrated sulfuric acid, separation of the pigment can be dispensed with, in which case, by adding oleum, while cooling, to the dispersion of the pigment in dilute sulfuric acid as obtained in the hydrolysis, the concentration is increased to a point where the dimethylquinacridone redissolves. Water is then added dropwise until the concentration of acid is reduced to such an extent that the pure dimethylquinacridone precipitates in the form of crystals.

Like unsubstituted quinacridone, dimethylquinacridone can be used as a pigment for many purposes after having been subjected to one of the conventional conditioning operations. Violet tints possessing an excellent fastness to light and an excellent fastness to migration are obtained. The dimethylquinacridone that has been purified by reprecipitation from sulfuric acid is obtained in two modifications; it is generally obtained in a stable form (see Table I, Example 1) and sometimes in a less stable form, which, in respect of shade, is indistinguishable from the stable form (see Table II, Example 1).

The following examples illustrate the invention. Unless otherwise stated, the parts and percentages are by weight:

*Example 1*

15 parts of 2:5-di-(para-toluidino)-terephthalic acid are introduced into 50 parts by volume of sulfuric acid of 100% strength, and the mixture is heated for ½ hour at 150° C. 23 parts of water are then added dropwise in the course of ¾ hour at the same temperature, and the resulting suspension is stirred for a further ½ hour at 150° C. The reaction mixture is then cooled to 50° C., stirred for 2 hours at 50° C., filtered on a glass or stoneware suction filter and washed with 100 parts by volume of sulfuric acid of 80% strength. The crystalline, dark violet residue is suspended in water, the suspension is rendered alkaline in the phenolphthalein range with dilute sodium hydroxide solution, stirred for 1 hour at 90 to 95° C., suction filtered hot, washed with hot water and then dried in vacuo at 100° C. The yield of crude dimethylquinacridone is 12.5 parts, or 91.9% of the theoretical yield.

10 parts of the crude product are introduced with cooling, into 50 parts by volume of sulfuric acid of 96% strength, the mixture is stirred for ¼ hour at 50° C. until dissolution is complete, then the pure compound is crystallized out in the form of long, bluish green to violet needles by the addition of 21 parts by volume of sulfuric acid of 50% strength at 50° C. in the course of 1 hour. After suction filtration at 50° C. and washing with 100 parts by volume of sulfuric acid of 85% strength, the residue is boiled in water for 1 hour, again suction filtered, washed with hot water and then dried in vacuo at 100° C.–8.9 parts of pure dimethylquanacridone are obtained (89% of the theoretical yield based on the crude pigment, or 81.8% of the theoretical yield based on the amount of 2:5-di-(para-toluidino)-terephthalic acid used).

To identify the modification of the dimethylquinacridone obtained an X-ray diffraction pattern was made by a conventional powder method with a bent-crystal camera focused according to the Guinier principle. The interplanar spacings could be calculated in the usual manner from the reflection angles. The values of the interplanar spacings were accurate to within ±2% and in general variation was less than ±1%. The relative intensities of the reflections were recorded from the films with a double beam micro-photodensitometer.

The two X-ray diffraction patterns of dimenthylquinacridone are compared in the following table.

| TABLE I | | TABLE II | |
|---|---|---|---|
| Most stable modification (only the strongest reflections are listed) | | Less stable modification that is sometimes obtained (only the strongest reflections are listed) | |
| Interplanar spacing (A.) | Line intensity | Interplanar spacing (A.) | Line intensity |
| 15.9 | Strong. | 16.1 | Strong. |
| 7.92 | Medium. | 8.03 | Medium. |
| 6.32 | Do. | 6.35 | Do. |
| 3.76 | Do. | 4.00 | Do. |
| 3.70 | Do. | 3.69 | Do. |
| 3.51 | Medium to strong. | 3.58 | Do. |
| | | 3.34 | Do. |
| 3.27 | Do. | 3.27 | Do. |

*Example 2*

30.1 parts of 2:5-di-(para-toluidino)-terephthalic acid are introduced in the course of 15 minutes into 50 parts by volume of sulfuric acid of 100% strength that has been heated to 100° C. The mixture is then heated for ½ hour at 150° C. in order to achieve ring closure and simultaneous sulfonation. Analysis shows that up to this point an average of about one sulfonic acid group has been introduced into the quinacridone molecule. The sulfonic acid groups that have been introduced are split off hydrolytically by the slow addition of 23 parts of water in the course of one hour at 150° C.; the crude pigment crystallizes out of the initially deep violet-red solution in the form of bluish red crystals. After stirring for a further ½ hour at 150° C., filtration is carried out directly on a pre-heated suction filter and the coarsely crystalline filter residue is washed with 100 parts by volume of cold sulfuric acid of 80% strength. An aliquot sample of the filter residue, which has been well suction-filtered in a dry atmosphere, is analysed for its pigment, sulfuric acid and water contents. The pigment content and $H_2SO_4$ content are determined by boiling in water, titration with sodium hydroxide solution, suction-filtering and washing and drying the filter residue, and the water content is determined from the difference in weight of the pigment content and $H_2SO_4$ content in relation to the weight of the aliquot sample. The crude pigment moist with sulfuric acid is then suspended in 100 parts of sulfuric acid of 100% strength with cooling. 65% oleum is then added dropwise at a temperature below 25° C. in an amount sufficient to produce a final sulfuric acid concentration of 98% strength. The whole is stirred for ¼ hour at 50° C. during which process a clear, deep red-violet solution is formed. The sulfuric acid concentration is reduced to 85% by the dropwise addition of a calculated amount of water at 50° C. in the course of 1 hour; the pure product, which crystallizes in the form of long needles, is isolated by suction filtration after a further stirring for 2 hours at 50° C., washed with sulfuric acid of 85% strength, boiled in water, suction-filtered, washed with hot water in the presence of a small amount of dilute ammonia, and then dried in vacuo. The yield of pure dimethylquinacridone is 21.8 parts (80.2% of the theoretical yield).

*Example 3*

30.1 parts of 2:5-di-(para-toluidino)-terephthalic acid are introduced at 100° C. into 50 parts by volume of sulfuric acid of 98% strength, and the reaction mixture is heated for ½ hour at 150° C. The dimethylquinacridone sulfonic acids that are formed are split hydrolytically by slowly adding 17.6 parts of water at 150° C. and subsequently stirring for 1 hour at 150° C. the thin suspension is cooled to 40° C. The concentration of acid is increased to such an extent by the addition of 100 parts of oleum of 67.0% strength at 40 to 47° C. in the course of 2 hours that a few minutes after the dropwise addition of the oleum has been completed and the temperature has been raised to 50° C., a clear, deep red-violet solution is formed. By the dropwise addition of 28.5 parts of water at 50° C. in the course of 1 hour, the pure product is precipitated in the form of long needles, some of which are in the form of bundles. After stirring for 2 hours at 50° C., the suspension is suction-filtered, the residue is washed with 150 parts by volume of cold sulfuric acid of 85% strength, and the residue is boiled in water. The red-violet suspension is rendered alkaline in the phenolphthalein range by the addition of sodium hydroxide solution of 30% strength, suction-filtered, the filter residue is washed with hot water and then dried in vacuo. 21 parts of pure dimethylquinacridone are obtained (77.2% of the theoretical yield).

The purity test is carried out by recrystallization from sulfuric acid by the method described in the second paragraph of Example 1, and shows a yield of 97%, that is to say, a figure that is obtained only with 100% dimethylacridone.

*Example 4*

In a manner similar to that described in the preceding examples, good yields of dimethylquinacridone that is free from sulfonic acid groups can be obtained directly in a simple manner by directly heating 2:5-di-(para-toluidino)-terephthalic acid with sulfuric acid of lower concentration. For example, 30.1 parts of 2:5-di-(para-toluidino)-terephthalic acid are introduced at 150° C. into 150 parts of sulfuric acid of 80% strength. The reaction mixture is stirred for 6 hours at 150° C., directly suction-filtered while hot and then washed with sulfuric acid of 80% strength. The crystalline, dark violet residue is boiled in water which has been made alkaline in the phenolphthalein range by the addition of sodium hydroxide solution, suction-filtered, washed with water and then dried. The yield is 60.5% of the theoretical yield. The degree of purity, determined by recrystallization from sulfuric acid as per Example 1, is 86%.

Practically equivalent results are also obtained, for example, when using other concentrations of sulfuric acid within the wide range of 75 to 92% strength at temperatures of 120 to 180° C. The higher the concentration of sulfuric acid and the reaction temperature, the shorter is the time required to bring about complete ring closure. When using sulfuric acid of more than 80% strength it is advantageous to isolate the pigment at a temperature below 100° C. in order to avoid loss due to too great a solubility. Thus, dimethylquinacridone can be isolated in an amount equivalent to 70% of the theoretical yield by heating 2:5-di-(para-toluidino)-terephthalic acid for 3½ hours at 165° C. in 5 parts of sulfuric acid of 90% strength and then cooling to 50° C.

*Example 5*

18.8 parts of 2:5-di-(para-toluidino)-terephthalic acid are stirred in 94 parts of oleum of 8.5% strength for ½ hour at 100° C. and then for 30 minutes at 150° C. 17 parts of water are then added dropwise and the whole is stirred for 1½ hours at 150° C. After cooling to 50° C., working up is carried out as described in Example 1. The yield of dimethylquinacridone is 13.4 parts.

*Example 6*

18.8 parts of 2:5-di-(para-toluidino)-terephthalic acid are stirred for ½ hour at 150° C. in 92 parts of sulfuric acid of 98% strength. After dilution with 35 parts of water to a sulfuric acid concentration of 70% strength, the whole is stirred for a further ½ hour at 150° C., suction-filtered while hot and worked up as described in Example 1. The yield of crude dimethylquinacridone is quantitative.

If, on the other hand, the hydrolysis of the sulfonic acid groups that have been introduced is carried out under otherwise the same conditions with a sulfuric acid concentration of 75%, the amount of crude pigment obtained is equivalent only to 94% of the theoretical yield, but the content of pure pigment is higher.

*Example 7*

18.8 parts of 2:5-di-(para-toluidino)-terephthalic acid are introduced at 100° C. into 52 parts by volume of sulfuric acid of 90% strength in the course of 20 minutes, while stirring. The reaction mixture is then heated for 3¼ hours at 165° C., 10 parts of water are added dropwise and stirring is continued for a further ½ hour at 165° C. After cooling to 70° C., 12.6 parts of dimethyl-quinacridone having a pure product content of 88% can be isolated in the manner described in Example 1.

When, for comparison purposes, the process is carried out by the method described in copending U.S. patent application filed April 2, 1962, by Armin Caliezi et al., Serial No. 187,151, in which ring closure of the 2:5-di-(para-toluidino)-terephthalic acid is effected by heating for ½ hour to 1 hour at 150° C. with sulfuric acid of 96 to 100% strength and subsequently the sulfonic acid groups that are introduced (0.7 to 2 $SO_3H$ groups per molecule, according to analysis) are again split off by heating for 10 hours in sulfuric acid of 5% strength at 205° C. in an autoclave, the crude product is obtained in almost quantitative yield; its purity, however, when determined by recrystallization from sulfuric acid as per Example 1, is at most 45% and is generally lower than this.

What is claimed is:
1. A process for the preparation of 2:9-dimethyl-quinacridine-7:14-dione, wherein sulfuric acid of at least 70% strength which also may contain free $SO_3$ is allowed to act on 2:5-di-(para-toluidino)-terephthalic acid, to effect cyclisation and sulfonation, and the sulfonic acid groups that have been introduced are split off with sulfuric acid of 70 to 92% strength at a temperature between 100 and 180° C. by heating without the application of superatmospheric pressure.
2. A process as claimed in claim 1, wherein the cyclisation is carried out in sulfuric acid of 95 to 100% strength.
3. A process as claimed in claim 1, wherein oleum having an $SO_3$ content not exceeding 20% is used.
4. A process as claimed in claim 1, wherein the cyclisation is carried out at a temperature between 50 and 200° C.
5. A process as claimed in claim 4, wherein the operation is carried out at a temperature between 120 and 180° C.
6. A process as claimed in claim 1, wherein 2 to 5 parts by weight of sulfuric acid which may contain free $SO_3$ are used for each part by weight of 2:5-di-(para-toluidino)-terephthalic acid.

References Cited by the Examiner

FOREIGN PATENTS 896,803   5/62   Great Britain.

NICHOLAS S. RIZZO, *Primary Examiner.*

UNITED STATES PATENT OFFICE
CERTIFICATE OF CORRECTION

Patent No. 3,200,122 August 10, 1965

Henri Streiff

It is hereby certified that error appears in the above numbered patent requiring correction and that the said Letters Patent should read as corrected below.

Column 1, line 21, for "2:9-diethylquinacridone" read -- 2:9-dimethylquinacridone --; column 2, line 61, for "100° C.-8.9" read -- 100° C. 8.9 --; column 4, line 3, for "40 to 47° C." read -- 40 to 45° C. --.

Signed and sealed this 5th day of April 1966.

(SEAL)
Attest:

ERNEST W. SWIDER
Attesting Officer

EDWARD J. BRENNER
Commissioner of Patents